United States Patent [19]

Morel

[11] Patent Number: 4,534,628

[45] Date of Patent: Aug. 13, 1985

[54] HINGE FOR MOUNTING SPECTACLES

[75] Inventor: Michel Morel, Morbier, France

[73] Assignee: Paget et Morel, Morex, France

[21] Appl. No.: 440,757

[22] Filed: Nov. 12, 1982

[30] Foreign Application Priority Data

Nov. 20, 1981 [FR] France ................ 81 21926

[51] Int. Cl.³ .................. G02C 5/22; G02C 5/14
[52] U.S. Cl. .................... 351/153; 351/121
[58] Field of Search ............. 351/113, 121, 153; 16/228

[56] References Cited

U.S. PATENT DOCUMENTS

| 3,034,402 | 5/1962 | Alberetti | 351/153 |
| 4,005,930 | 2/1977 | Guenin | 351/153 |
| 4,448,502 | 5/1984 | Tota | 351/153 |

FOREIGN PATENT DOCUMENTS 3039557 5/1981 Fed. Rep. of Germany .
1183993 10/1957 France .

Primary Examiner—Rodney B. Bovernick
Attorney, Agent, or Firm—Lackenbach Siegel Marzullo Presta & Aronson

[57] ABSTRACT

The hinge comprises an elastic return mechanism (8, 12, 13) for the side (5) towards its normal open position, said mechanism being positioned concentrically in the side (5).

The elastic return mechanism comprises an envelope (8) which abuts against a spring (12) positioned inside an external casing (13) which is able to slide on the envelope (8).

Beyond the normal open position, this casing moves back while sliding around the envelope (8) and causes compression of the spring (12).

The envelope (8) which is integrated with the side (5) directly abuts against the spring (12), or a stopping member (16) is interposed between the envelope (8) and the spring (12), this member (16) being integrated with the side (5).

13 Claims, 10 Drawing Figures

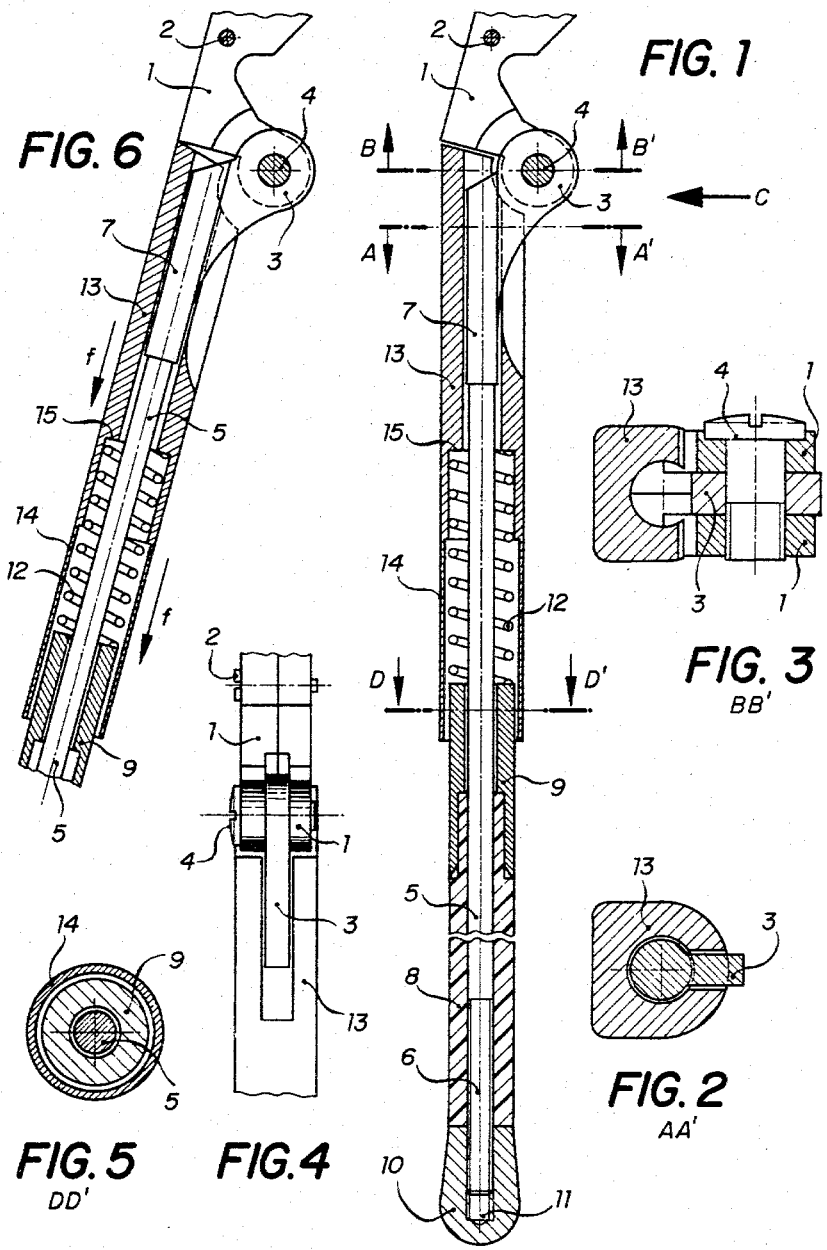

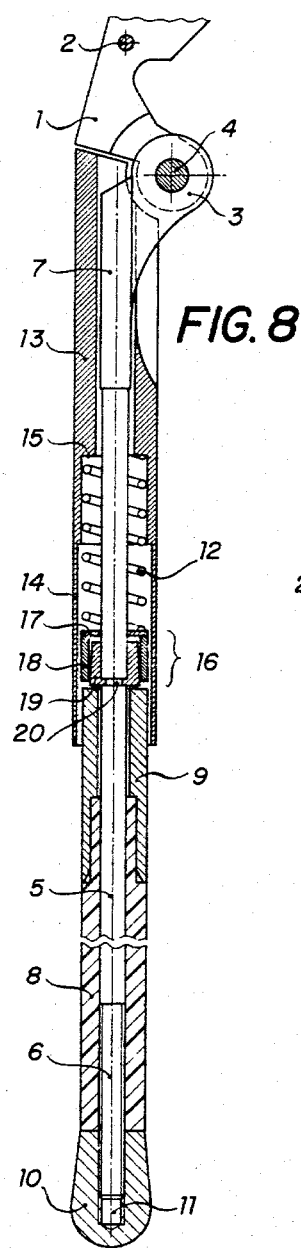
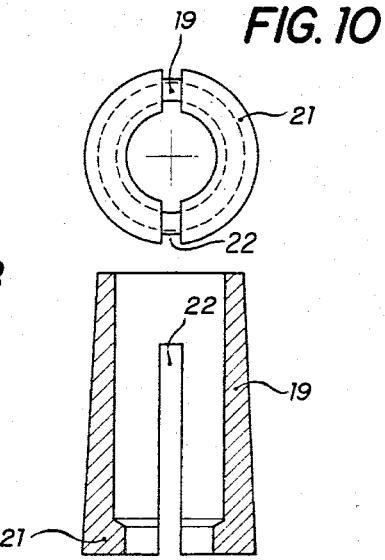
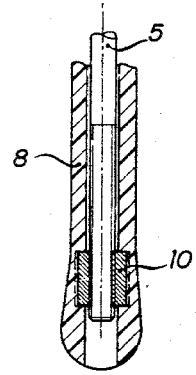

HINGE FOR MOUNTING SPECTACLES

This invention relates to an elastic type of hinge for mounting spectacles, i.e., it allows the side of the spectacle frame to extend beyond the normal open position and allows the elastic return thereof into this position.

This type of hinge is known to be popular in that it reconciles comfortable wearing, without the risk of hurting the ears (as would be the case with too tight a mounting), with an adequate support, without the risk of sliding (as would be the case with too loose a mounting). Moreover, these hinges facilitate the putting on of the spectacles.

However, they do have quite considerable disadvantages which essentially include an encumbrance which detracts from the aesthetic aspect of the pair of spectacles, especially if they have thin sides. In fact, these hinges are relatively thick and are joined onto the side, generally on the inside. Another disadvantage arises from the fact that a hinge of this type is complicated, comprises numerous delicate parts and is expensive to produce.

The present invention, on the contrary, proposes a hinge which, while being of an elastic type, does not essentially affect the thickness of the side, and comprises a small number of simple elementary parts. This hinge comprises two knuckles, one of which is attached to the part of the spectacle frame supporting the lenses and the other is supported by the side. The elastic return mechanism is positioned concentrically in the side and comprises an envelope covering the side from its end.

In order to clarify the following description, the knuckle which is attached to the part of the spectacle frame supporting the lenses will be termed the "mounting knuckle", and the knuckle which is supported by the side will be termed the "side knuckle".

The envelope is interrupted by abutting against elastic return means positioned inside an external casing which is able to slide on the envelope. This casing is profiled to be able to abut against the mounting knuckle in the normal open position and, beyond this position, to be able to move back by sliding around the envelope, thus causing compression of the elastic return means.

The knuckle which is attached to the part of the spectacle frame supporting the lenses may be the female knuckle, while the male knuckle is supported by the side or, conversely, the male knuckle may be attached to the part of the spectacle frame supporting the lenses with the female knuckle supported by the side.

The elastic return means may comprise a spring or a natural or synthetic elastomeric filling material, and the envelope may be produced in one or more parts.

The external casing which slides on the envelope may be square, cylindrical or any external shape. This external shape is simply dictated by aesthetic preferences. On the inside with respect to the side, the casing has a slit for the passage of the side knuckle. It is profiled depending on the shape of the mounting knuckle.

In a first embodiment, the envelope directly abuts against the elastic return means. In this case, the envelope must be integrated with the side, which may be effected during assembly by any means, for example by gluing or screwing.

In a second embodiment, the envelope abuts against the elastic return means by means of a member which is interposed between them.

In a variant, the member, is floating between the return means and the envelope, and the envelope is integrated with the side as indicated above.

In another variant, the member is a stopping member, integral with the side in order to stop the return means in a positive manner. There is no further functional necessity for the side and envelope to be integrated, although this is clearly desirable to avoid all sliding movements during use. Light gluing is sufficient.

A return member of this type advantageously comprises several parts, for example a disc resting against the return means while being in contact with a tube. This tube contains split, conical pincers which are blocked on the side by a cut made therein.

The present invention will be more clearly understood by referring to the accompanying drawings which illustrate non-limiting examples of embodiments of the hinge according to this invention. In these examples, the mounting knuckle is female and the side knuckle is male.

FIG. 1 illustrates a sectional view of the mounted hinge, the side being straight in the illustration before the optician produces the curvature depending on the morphology of the customer. It is in the normal open position.

FIG. 2 illustrates a sectional view of the hinge of FIG. 1, along line A,A', in the direction of the arrows.

FIG. 3 illustrates a sectional view of the hinge of FIG. 1, along the axis B,B', in the direction of the arrows.

FIG. 4 illustrates a side view, from the inside, of the hinge of FIG. 1, according to arrow C.

FIG. 5 illustrates a sectional view of the hinge of FIG. 1, along line D,D', in the direction of the arrows.

FIG. 6 illustrates an identical view to that of FIG. 1, the hinge being drawn out and the side being in an open position beyond the normal open position.

FIG. 7 illustrates another method of attaching the envelope to the side.

FIG. 8 illustrates an identical view to that of FIG. 1 in the variant with a stopping member.

FIGS. 9 and 10 illustrate views of the split conical pincers, a constitutive element of the stopping member illustrated in FIG. 8.

FIG. 1 illustrates a female knuckle 1 (in two parts as will be seen later on in FIG. 3), with a screw 2 for attachment to the part of the spectacle frame supporting the lenses. A male knuckle 3 is attached to the female knuckle 1 by an attachment screw 4 and is extended by side 5. This side 5 is terminated by a threaded end 6 and, at the level of the joint with the male knuckle 3, comprises a reinforced part 7.

The side 5 is covered by an envelope 8 which, in the case in question, is composite. It comprises a metallic reinforced part 9 and an end which is also metallic and is used as a covering nut 10 and is attached to the threaded end 6 of the side 5 by its inside thread 11.

As mentioned above, the envelope 8 may comprise a single part which is produced, for example by injection, and is threaded inside to be screwed onto the threaded part 6 of the side 5. In a variant, this envelope 8 may be glued onto the side 5.

The reinforced part 9 of the envelope 8 abuts against a spring 12 housed inside an external casing 13. This casing 13 comprises a part 14 of a large internal diameter which is to slide outside on the reinforced part 9 of the envelope 8. The casing 13 also comprises a part which has a smaller internal diameter in order to produce an internal shoulder 15 against which the spring 12 comes to rest.

FIG. 2 illustrates a cross section along line A-A', and shows the casing 13 and, inside, the side at the level of the male knuckle 3.

FIG. 3 which illustrates a cross section further up along the axis B-B', shows the female knuckle 1 in two parts joined by the screw 2, and also shows the male knuckle 3. The attachment screw 4 joins the two knuckles and the casing 13 is in the top position.

FIG. 4 which is a side view according to arrow C shows the female knuckle 1 with its two parts joined by the screw 2, and shows the male knuckle 3. The casing 13 is also shown, as is the screw 4 which joins the female knuckle 1 and the male knuckle 3.

FIG. 5 which illustrates a cross section along line D-D' shows the side 5 inside the envelope which is illustrated here by its reinforced metallic part 9. The casing may be seen on the outside at the level of the part 14, which has a large internal diameter and is capable of sliding around the envelope.

In FIG. 6, the side of the spectacles has been moved beyond its normal open position. By rotating about the axis represented by the screw 4, the casing 13 has passed its abutment position against the female knuckle 1 and has been forced to move back in the direction of arrow f. As a result of this movement, the part 14 of the casing slides around the reinforced part 9 of the envelope. The shoulder 15 which is the rest point of the spring is thus also displaced in the direction of arrow f. Since the envelope (reinforced part 9) is integral with the side 5, it does not move and thus it is the spring 12 which is compressed, its available volume decreasing.

Thus, a restoring force is produced which tends to return the side in the direction opposite to arrow f and, by a pivoting movement about the screw 4, tends to return said side into its normal open position.

It should be noted that, in this embodiment, the degree to which the nut 10 is screwed onto the threaded part 6 of the side 5 directly affects the available volume of the spring 12, thus also affects its tension and, consequently, affects the restoring force of the side towards its normal open position. The nut 10 is therefore a means of adjusting the elastic restoring force.

It is the same in the embodiment illustrated in FIG. 7 in which the envelope 8, all in one block is moulded onto the nut 10 which receives the side 5. This nut 10 has surface roughnesses, for example longitudinal ridges to prevent it turning inside the envelope.

FIG. 8 which reverts to the references of FIG. 1 illustrates a stopping member 16 which is integrated with the side 5. This solution is preferable to that of a floating member, to avoid the violent expulsion of all the parts when the envelope 8 is unscrewed from the side 5, voluntarily or not.

The stopping member 16 comprises a disc 17 which rests against the spring 12 and is in contact with a tube 18. This tube contains split conical pincers 19 which are blocked on the side 5 by a cut 20 made therein.

In assembly, by threading the envelope 8 onto the side 5, the member 16 advances, the tube 18 squeezing the pincers 19. When the pincers 19 arrive at the level of the cut 20, they close over it, forming a shoulder. The pincers 19, and thus the member 16 as a whole, can no longer move backwards. It is blocked on the side.

The covering nut 10, as shown, is not indispensible. In fact, no attachment is necessary at this level and it is possible to rely on the frictional forces between the envelope 8 and the side 5. However, in practice, a light gluing is at least carried out.

FIG. 9 illustrates a longitudinal sectional view of the split conical pincers 19, the angle of conicity of which is advantageously from 1.5° to 5°, for example 3°. These pincers 19 comprise a shoulder 21 which is to take up a position in the cut 20 provided in the side 5. The slit 22 give the pincers 19 the necessary elasticity for them to be threaded and displaced on the side 5.

FIG. 10 which is a view from below (FIG. 9 seen from right to left), shows the elements of the previous Figure.

In a modification which is not shown in the Figures, the female knuckle 1 and/or the male knuckle 3 are not cylindrical and have one or more bosses acting as a cam. In this way, the casing is forced to move back during the passage into the intermediate position between the normal open position and the bent back position. Thus, a compressive force is produced in the spring which renders the intermediate position unstable. While trying to expand, the spring tends to return the side towards the one or other open or bent back position. Thus, a mounting has been produced for the automatic open or closed positioning of the sides.

The simplicity of the hinge according to the present invention will be appreciated as it comprises a minimum number of parts, all of which are standard or are easy to machine. Moreover, the hinge cannot detract in any way from the aesthetic aspect of the spectacles due to its small thickness and to its concentric position on the side.

In conclusion, the other embodiment should be recalled in which the knuckle attached to the part of the spectacle frame supporting the lenses is male, while the female knuckle is the one supported by the side.

I claim:

1. In an improved hinge for mounting a side of a spectacle frame which allows said side to open beyond its normal open position and also allows its elastic return into said normal open position, with said hinge having a mounting knuckle attached to that part of said spectacle frame supporting the lenses and a co-operating side knuckle supported by said side; said improvement comprising an elastic return mechanism positioned concentrically in said side comprising an envelope enclosing said side from its end and abutting against an elastic return means positioned inside an external casing which is capable of sliding on said envelope, said external casing further abutting against said mounting knuckle in said normal open position and, when opened beyond said normal open position, said external casing being capable of moving back by sliding on said envelope so as to cause compression of said elastic return means; and thereby retaining substantially the same side thickness as a comparably sized spectacle.

2. A hinge according to claim 1, in which said mounting knuckle is female and said side knuckle is male.

3. A hinge according to claim 1, in which said elastic return means comprise a spring.

4. A hinge according to claim 1, in which said elastic return means comprise an elastomeric filling material.

5. A hinge according to claim 1, in which said envelope is interrupted by directly abutting against said elastic return means.

6. A hinge according to one of claims 1 or 5, in which said envelope is integrated with said side by screwing, and an inside thread of the envelope being screwed onto a threaded end of the side.

7. A hinge according to one of claims 1 or 5, in which said envelope is integrated with said side by screwing by means of a nut moulded in said envelope.

8. A hinge according to one of claims 1 or 5, in which said envelope comprises at least two independent parts, one of which is a covering nut which is screwed onto a threaded end of said side.

9. A hinge according to claim 1, in which said envelope is interrupted by abutting against said elastic return means by means of a member interposed between them.

10. A hinge according to claim 9, in which said interposed member is a stopping member, integrated with said side in order to stop said elastic return means in a positive manner.

11. A hinge according to claim 10, in which said stopping member is integrated with said side by forming a shoulder in a cut made in said side.

12. A hinge according to claim 11, in which said stopping member comprises a disc which rests against said elastic return means and is in contact with a tube containing split conical pincers, said split conical pincers blocking said stopping member on said side by forming a shoulder in said cut.

13. A hinge according to claim 1, in which one or the other of said knuckles is adapted to force said external casing to move back, compressing said elastic return means during passage of said side into an intermediate position between being open and closed.

* * * * *